(12) United States Patent
Uchimura (10) Patent No.: US 11,276,107 B2
(45) Date of Patent: *Mar. 15, 2022

(54) PRODUCT MANAGEMENT DEVICE, CONTROL METHOD FOR PRODUCT MANAGEMENT DEVICE, AND PROGRAM

(71) Applicant: NEC CORPORATION, Tokyo (JP)

(72) Inventor: Jun Uchimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/495,162

(22) PCT Filed: Mar. 14, 2018

(86) PCT No.: PCT/JP2018/009931
§ 371 (c)(1),
(2) Date: Sep. 18, 2019

(87) PCT Pub. No.: WO2018/173879
PCT Pub. Date: Sep. 27, 2018

(65) Prior Publication Data
US 2020/0104906 A1    Apr. 2, 2020

(30) Foreign Application Priority Data

Mar. 22, 2017  (JP) .............................. JP2017-056147

(51) Int. Cl.
*G06Q 30/00* (2012.01)
*G06Q 30/06* (2012.01)
(Continued)

(52) U.S. Cl.
CPC ......... *G06Q 30/0641* (2013.01); *G06Q 10/06* (2013.01); *G06Q 10/087* (2013.01);
(Continued)

(58) Field of Classification Search
CPC .... G06Q 30/00; G06Q 30/06; G06Q 30/0601; G06Q 30/0641; G06Q 10/00;
(Continued)

(56) References Cited

U.S. PATENT DOCUMENTS

| | | | |
|---|---|---|---|
| 6,435,407 B1 * | 8/2002 | Fiordelisi | G06Q 30/06 235/383 |
| 7,575,162 B1 | 8/2009 | Malchak et al. | |

(Continued)

FOREIGN PATENT DOCUMENTS

| | | |
|---|---|---|
| CA | 2406335 A1 | 7/1998 |
| CN | 109829777 A * | 5/2019 |

(Continued)

OTHER PUBLICATIONS

Nikolova, Hristina, and Jeffrey J. Inman. "Shopper-Facing Retail Technology: A Retailer Adoption Decision Framework Incorporating Shopper Attitudes and Privacy Concerns." Research Gate, Feb. 13, 2017, www.researchgate.net/publication/313731222_Shopper-Facing_Retail_Technology_A_Retailer_Adoption_Decision_Framework_.*

(Continued)

*Primary Examiner* — Mila Airapetian
(74) *Attorney, Agent, or Firm* — Sughrue Mion, PLLC (57) ABSTRACT

A product management device includes: a reception state storage unit configured to, on the basis of changes in reception states of signals transmitted from tag devices attached to products, store identification information of products in which changes have occurred; a movement path detection unit configured to detect a movement path of a purchaser in a store in which the products are placed; and a list output unit configured to output a list of products placed at locations close to the movement path among the products (Continued)

for which changes in the reception states are equal to or greater than a threshold value.

7 Claims, 5 Drawing Sheets

(51) Int. Cl.
*G06Q 10/08* (2012.01)
*G06Q 10/06* (2012.01)
*G06Q 30/02* (2012.01)

(52) U.S. Cl.
CPC ......... *G06Q 30/02* (2013.01); *G06Q 30/0633* (2013.01); *G06Q 30/0639* (2013.01)

(58) Field of Classification Search
CPC ...... G06Q 10/08; G06Q 10/087; G06Q 30/02; G06Q 30/0633; G06Q 30/0639; G06Q 30/08
USPC ...................................... 705/27.1, 26.1–27.2
See application file for complete search history.

(56) References Cited

U.S. PATENT DOCUMENTS

| | | | |
|---|---|---|---|
| 8,286,868 B2 | 10/2012 | Edwards | |
| 9,171,448 B1* | 10/2015 | Foster | G06Q 10/087 |
| 9,911,290 B1 | 3/2018 | Zalewski et al. | |
| 9,959,439 B1 | 5/2018 | Lui et al. | |
| 10,810,540 B1* | 10/2020 | Gopal | G01G 19/387 |
| 10,949,723 B2 | 3/2021 | Trivelpiece et al. | |
| 11,011,038 B2 | 5/2021 | Bergman et al. | |
| 2007/0239569 A1* | 10/2007 | Lucas | G06Q 10/087 705/28 |
| 2008/0129461 A1 | 6/2008 | Abraham | |
| 2008/0182723 A1 | 7/2008 | Aaron et al. | |
| 2008/0249899 A1* | 10/2008 | Nasser | G08B 21/0227 705/28 |
| 2012/0206449 A1 | 8/2012 | Stark | |
| 2012/0287095 A1 | 11/2012 | Cote et al. | |
| 2014/0167920 A1* | 6/2014 | Kamiya | G01S 13/76 340/10.1 |
| 2015/0012396 A1 | 1/2015 | Puerini et al. | |
| 2016/0055360 A1 | 2/2016 | Haugarth | |
| 2017/0011606 A1 | 1/2017 | Ceccon et al. | |
| 2017/0148005 A1 | 5/2017 | Mum | |
| 2017/0161711 A1* | 6/2017 | Chin | G06K 7/10009 |
| 2017/0228811 A1 | 8/2017 | Moreau et al. | |
| 2017/0300999 A1* | 10/2017 | Wilkinson | G06F 16/288 |
| 2018/0040219 A1 | 2/2018 | Clark et al. | |
| 2018/0068258 A1 | 3/2018 | Blumenau | |
| 2018/0285812 A1 | 10/2018 | Humphrys | |
| 2019/0080281 A1 | 3/2019 | Tingler et al. | |
| 2019/0114889 A1* | 4/2019 | Tam | G06K 7/10128 |
| 2019/0267024 A1 | 8/2019 | Shin et al. | |
| 2019/0279185 A1 | 9/2019 | Cheng | |

FOREIGN PATENT DOCUMENTS

| | | | |
|---|---|---|---|
| JP | 2005-165819 A | 6/2005 | |
| JP | 2005-250931 A | 9/2005 | |
| JP | 2006-071411 A | 3/2006 | |
| JP | 2007-021007 A | 2/2007 | |
| JP | 2007-122266 A | 5/2007 | |
| JP | 2009-163331 A | 7/2009 | |
| JP | 2009-238025 A | 10/2009 | |
| JP | 2009-288061 A | 12/2009 | |
| JP | 2010-094332 A | 4/2010 | |
| JP | 2010-097458 A | 4/2010 | |
| JP | 2010-218280 A | 9/2010 | |
| JP | 2012-113661 A | 6/2012 | |
| JP | 2013-037663 A | 2/2013 | |
| JP | 2014-152018 A | 8/2014 | |
| TW | 201425200 A | 7/2014 | |
| TW | 201624410 A | 7/2016 | |
| TW | I570646 B | 2/2017 | |

OTHER PUBLICATIONS

International Search Report for PCT/JP2018/009931 dated, Apr. 24, 2018 (PCT/ISA/210).
Communication dated Apr. 22, 2020, from the Intellectual Property Office of Taiwan in Application No. 107108739.
Communication dated Apr. 14, 2020, issued by the Taiwan Intellectual Property Office in application No. 107108743.
International Search Report for PCT/JP2018/009955, dated Apr. 24, 2018 (PCT/ISA/210).
International Search Report for PCT/JP2018/009932 dated, May 29, 2018 (PCT/ISA/210).
Communication dated Mar. 23, 2020, issued by the Taiwan Intellectual Property Office in application No. 107108737.
Japanese Office Action for JP Application No. 2017-056147 dated Mar. 16, 2021 with English Translation.
U.S. Office Action and PTO-892 for U.S. Appl. No. 16/495,354 dated Nov. 26, 2021.

* cited by examiner

PRODUCT MANAGEMENT DEVICE, CONTROL METHOD FOR PRODUCT MANAGEMENT DEVICE, AND PROGRAM

CROSS REFERENCE TO RELATED APPLICATIONS

This application is a National Stage of International Application No. PCT/JP2018/009931 filed Mar. 14, 2018, claiming priority based on Japanese Patent Application No. 2017-056147, filed Mar. 22, 2017, the contents of which are incorporated herein by their reference.

TECHNICAL FIELD

The present invention relates to a product management device, a method of controlling the product management device, and a program.

BACKGROUND ART

In recent years, the trend in unmanned systems has strengthened in response to the demand for reduction in labor costs in stores such as convenience stores and technical development therefor has been carried out. Since clerks do not perform settlement for products in such unmanned stores, various settlement methods need to be devised and thus intensive research thereon has been conducted.

For example, Patent Document 1 discloses a technology for performing settlement for product purchase on the basis of weights in a technique of product purchaser reading information such as product prices using a product reading means such as a barcode reader.

In this Patent Document 1, first, a product purchaser puts a shopping basket containing products planned to be purchased on a weight measurement means provided in a front part of a product reading means and measures the weight of the shopping basket before reading. Next, the product purchaser takes the products out of the shopping basket and reads the products through the product reading means. Accordingly, price data and weight data of the products are acquired and a cumulative price and a cumulative weight of the purchased products are calculated. Then, the product purchaser puts the products which have been read by the product reading means into the shopping basket on a weight measurement means provided in a rear part and measures the weight of the shopping basket after reading.

Then, the gross weight of the products identified and calculated through the product reading means is compared with the weight of the shopping basket after the products have been read, for example, and if they do not correspond to each other, all the products have not been read. It is disclosed that when they do not correspond to each other, the product purchaser is notified of this and reading of all the products is promoted.

CITATION LIST

Patent Literature

[Patent Document 1] Japanese Unexamined Patent Application, First Publication No. 2005-250931

SUMMARY OF INVENTION

Problem to be Solved by the Invention

However, when unmanned stores spread, there will be no visual checking by clerks. Accordingly, there is a problem that which product in a product display rack has been picked up by a product purchaser cannot be detected in unmanned stores.

In addition, in the technology disclosed in Patent Document 1, when all products have not been read due to an erroneous operation of the reading means and the like during settlement, the occurrence of the erroneous operation can be informed of but reference information for identifying products which have not been read is not presented. Accordingly, all products need to be read again, which is inconvenient.

Accordingly, an object of the present invention is to provide a product management device capable of ascertaining which product has been picked up by a product purchaser even in an unmanned store and presenting reference information for identifying a product which has not been read even when all products have not been read due to an erroneous operation of a reading means and the like during settlement.

Means for Solving the Problem

The present invention devised to solve the above-described problems employs the following configurations in order to achieve the aforementioned object.

A product management device according to one embodiment of the present invention includes: a reception state storage unit configured to, on the basis of changes in reception states of signals transmitted from tag devices attached to products, store identification information of products in which changes have occurred; a movement path detection unit configured to detect a movement path of a purchaser in a store in which the products are placed; and a list output unit configured to output a list of products placed at locations close to the movement path among the products for which changes in the reception states are equal to or greater than a threshold value.

In addition, according to one embodiment of the present invention, in a method of controlling a product management device including a reception state storage unit configured to, on the basis of changes in reception states of signals transmitted from tag devices attached to products, store identification information of products in which changes have occurred, a movement path detection unit configured to detect a movement path of a purchaser in a store in which the products are placed, and a list output unit configured to output a list of products, the method includes controlling the list output unit such that a list of products placed at locations close to the movement path among the products for which changes in the reception states are equal to or greater than a threshold value is output.

A program according to one embodiment of the present invention causes a computer of a product management device to perform process, the product management device including a reception state storage unit configured to, on the basis of changes in reception states of signals transmitted from tag devices attached to products, store identification information of products in which changes have occurred, a movement path detection unit configured to detect a movement path of a purchaser in a store in which the products are placed, and a list output unit configured to output a list of products, the process includes controlling the list output unit such that a list of products placed at locations close to the movement path among the products for which changes in the reception states are equal to or greater than a threshold value is output.

Advantageous Effects of Invention

According to the present invention, it is possible to ascertain which product has been picked up by a product purchaser even in an unmanned store and to present reference information for identifying a product which has not been read even when all products have not been read due to an erroneous operation of a reading means and the like during settlement.

DESCRIPTION OF EMBODIMENTS

First Embodiment

<Product Management Device>

Figure 1:
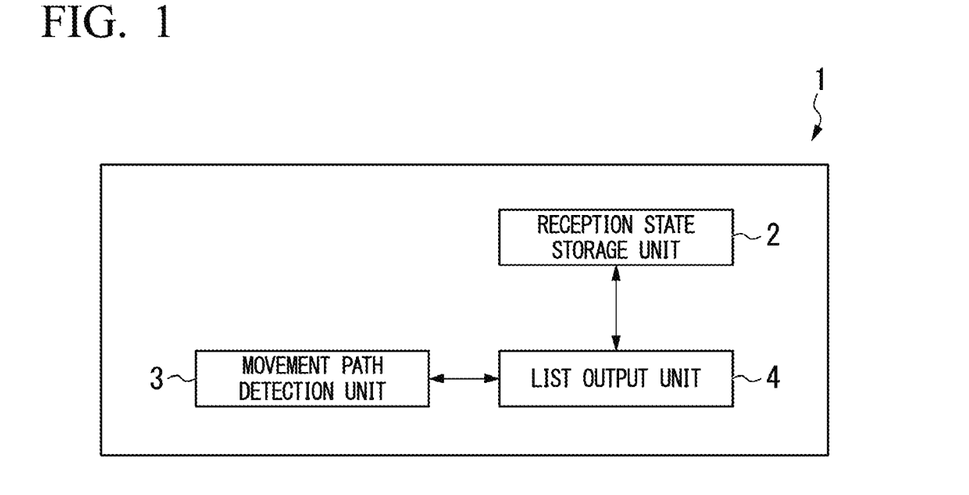
FIG. 1 is a diagram showing a product management device according to a first embodiment.

First, a product management device 1 according to a first embodiment will be described. FIG. 1 is a diagram showing the product management device 1 according to the first embodiment. As shown in FIG. 1, the product management device 1 according to the first embodiment includes a reception state storage unit 2, a movement path detection unit 3 and a list output unit 4.

The reception state storage unit 2 is a functional unit which, on the basis of changes in reception states of signals transmitted from tag devices attached to products, stores product identification information of the products in which changes have occurred. As a tag device, a radio frequency identifier (RFID) tag and the like may be exemplified. An RFID tag includes an IC chip having a memory in which product identification information has been stored and an antenna coil.

In addition, as a reception state of a transmitted signal, a received signal strength indicator (RSSI) value (received strength) and the like may be exemplified.

A change in a reception state of a signal transmitted from a tag device attached to a product occurs when, for example, a product purchaser physically moves the product by picking the product up, and the like.

The movement path detection unit 3 is a functional unit which detects a movement path of a product purchaser in a store. As a method of detecting a movement path, a method of issuing a membership card with an RFID tag to a product purchaser, a method of using an automatic recognition technique according to camera images and the like may be used.

The list output unit 4 is a functional unit which outputs a list of products.

<Method of Controlling Product Management Device>

The product management device 1 of the present embodiment controls the list output unit 4 such that a list of products placed at locations close to a movement path of a product purchaser among products for which reception state changes are equal to or greater than a threshold value is output.

For example, when an RFID tag is used as a tag device, an RSSI value may slightly change even if a product is not physically moved. Accordingly, it is determined whether a reception state change is equal to or greater than the threshold value. That is, the present embodiment requires a reception state change to be equal to or greater than the threshold value in order to determine that the product has been moved.

Reception state changes also include a case in which a state in which reception has been being performed is changed to a state in which reception has not been performed. This is because it is conceivable that a product may have been moved from a location at which reception is possible to a location at which reception is not possible in this case.

In the present embodiment, it is possible to consistently monitor reception states of signals transmitted from tag devices attached to products and output a list of products for which reception states have changed by the threshold value or more. Because the reception states have changed by the threshold value or more, the products output as a list can be regarded as physically moved products.

Accordingly, it is possible to ascertain which product has been picked up by a product purchaser even in an unmanned store.

Therefore, it is possible to obtain marketing information about consumer trends which indicates not only actually purchased products but also products that have not been actually purchased but have been picked up and have drawn attention.

In addition, according to the present embodiment, a list of products is also presented when RFID tags of all products planned to be purchased have not been read due to an erroneous operation of an RFID reader and the like during settlement. Accordingly, a product purchaser can easily identify products which have not been read.

That is, products identified on the basis of reception state changes are physically moved products. Accordingly, products identified on the basis of reception state changes are products which are highly probably contained in a shopping basket. In addition, a product placed at a location close to a movement path of the product purchaser among the products identified on the basis of reception state changes may be regarded as a product which is more highly probably contained in the shopping basket of the product purchaser.

Therefore, products which have already been read through the RFID reader are excluded from the list of products. Accordingly, it becomes possible to provide a list of products which are very likely to be contained in a shopping basket during settlement and have not been read through the RFID reader.

Therefore, a product purchaser can easily identify a product which has not been read by searching the shopping basket for the products in the product list.

Second Embodiment

<Product Management Device>

Next, a product management device 11 according to a second embodiment of the present invention will be described.

Figure 2:
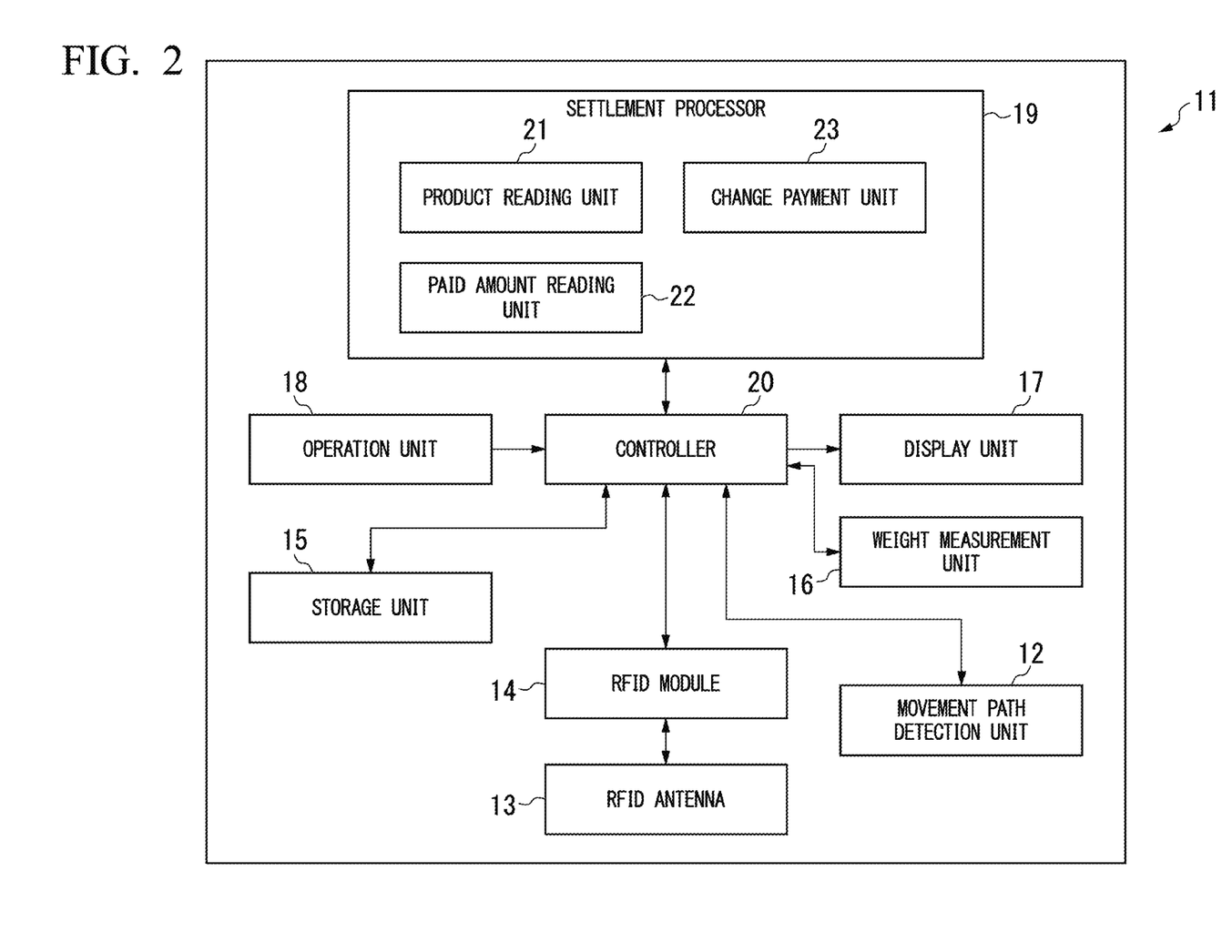
FIG. 2 is a diagram showing a product management device according to a second embodiment.

FIG. 2 is a diagram showing the product management device 11 according to the second embodiment. The product management device 11 of the second embodiment includes a movement path detection unit 12, an RFID antenna 13, an RFID module 14, a storage unit 15, a weight measurement unit 16, a display unit 17, an operation unit 18, a settlement processor 19, and a controller 20, as shown in FIG. 2.

The movement path detection unit 12 may include a camera, for example. The movement path detection unit 12 is a functional unit which detects a movement path of a product purchaser in a store through an automatic recognition technique using camera images.

The RFID antenna 13 is an antenna which takes charge of transmitting/receiving radio waves to/from RFID tags attached to products and receives signals transmitted from the RFID tags attached to the products. In addition, the RFID module 14 reads product identification information and RSSI values from signals received by the RFID antenna and outputs these to the controller 20.

It is preferable that a plurality of RFID antennas 13 be installed on the ceiling, product racks and the like of a store at predetermined intervals.

The storage unit 15 stores various types of information about products. Specifically, the storage unit 15 stores product identification information, product names, weights of products, locations at which products are placed, movement paths of product purchasers, RSSI values, RFID antenna numbers of RFID antennas that have received signals transmitted from RFID tags, and the like.

In addition, the storage unit 15 outputs such information to the controller 20 or stores such information on the basis of an instruction of the controller 20.

An RFID antenna number is a number for individually identifying an RFID antenna, and one number is assigned to one antenna.

The weight measurement unit 16 includes a weight sensor and the like, for example. The weight measurement unit 16 measures the weights of products planned to be purchased by a product purchaser and outputs the measurement results to the controller 20. As a specific measurement method, for example, a method of weighing a shopping basket containing products planned to be purchased as it is through the weight sensor may be conceived.

The display unit 17 includes a display device such as a liquid crystal panel, for example, and displays various types of information on the basis of an output from the controller 20.

The operation unit 18 detects various operations performed by a product purchaser and outputs operation signals according to the operations to the controller 20.

The settlement processor 19 is a functional unit which includes a product reading unit 21, a paid amount reading unit 22 and a change payment unit 23 and performs a settlement process for products. The product reading unit 21 has an RFID reader for reading product identification information from an RFID tag attached to each product, and the like, for example. The product reading unit 21 outputs the read product identification information to the controller 20. Although the RFID reader can read RFID tags of all products contained in a shopping basket at one time, the RFID reader may not read RFID tags for some products depending on a positional relationship.

Further, the paid amount reading unit 22 reads an amount of money paid by a product purchaser and outputs the read amount of money to the controller 20.

In addition, the change payment unit 23 pays change to the product purchaser on the basis of an instruction from the controller 20.

The controller 20 is a functional unit which receives various outputs from the movement path detection unit 12, the RFID module 14, the storage unit 15, the weight measurement unit 16, the display unit 17, the operation unit 18, the product reading unit 21, the paid amount reading unit 22 and the change payment unit 23 or transmits various instructions to these components. Further, the controller 20 is a functional unit which performs various computation processes. Specific processes performed by the controller 20 will be described later.

<Method of Controlling Product Management Device>

Figure 3:
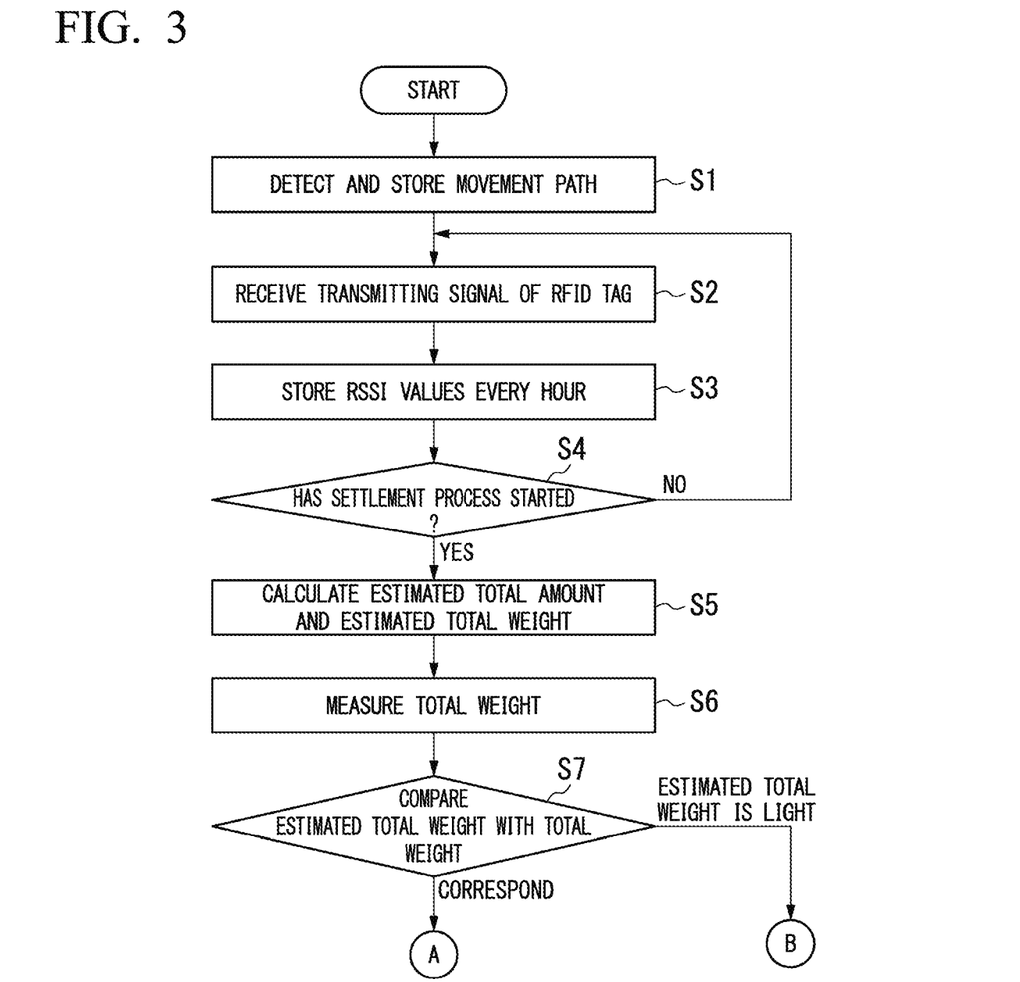
FIG. 3 is a first flowchart showing a method of controlling the product management device according to the second embodiment.

Next, a method of controlling the product management device 11 of the present embodiment will be described using FIG. 3. FIG. 3 is a first flowchart showing a method of controlling the product management device 11 according to the second embodiment.

(Step S1)

First, when a product purchaser enters a store, the movement path detection unit 12 detects a movement path of the product purchaser.

Specifically, the camera of the movement path detection unit 12 detects the product purchaser entering the store and then automatically tracks the product purchaser until the product purchaser exits the store. In addition, the movement path detection unit 12 outputs a movement path of the product purchaser in the store to the controller 20 and the controller 20 causes the storage unit 15 to store this information.

(Step S2)

Next, transmitting signals transmitted from RFID tags are received with respect to all products in the store.

Specifically, the RFID antennas 13 receive a transmitting signal transmitted from an RFID tag attached to each product. Then, the RFID module 14 reads product identification information and RSSI values from radio waves received by the RFID antennas 13 and outputs RFID antenna numbers along with the product identification information and the RSSI values to the controller 20 on the basis of an instruction of the controller 20.

(Step S3)

Next, the controller 20 outputs the product identification information, RSSI values and RFID antenna numbers input in step S2 to the storage unit 15 at specific time intervals. The storage unit 15 stores the information and the time when this information has been acquired for each piece of product identification information.

As the specific time, an arbitrary period can be set. It is preferable to set a short period because it is desirable to continuously check RSSI values.

(Step S4)

Next, whether the product purchaser has started a settlement process is checked. As a checking method, for example, it is possible to check whether the product purchaser has put a shopping basket on the weight measurement unit 16 or to check whether the product purchaser has performed an input operation for starting the settlement process using the operation unit 18.

Further, when the product purchaser has not started the settlement process (NO in step S4), the procedure returns to step S2.

(Step S5)

When the settlement process has been started in step S4 (YES in step S4), subsequently, an estimated total amount and an estimated total weight of products planned to be purchased are calculated.

Specifically, the product reading unit 21 reads product identification information for each product by reading RFID tags attached to products contained in the shopping basket through the RFID reader. Then, the product reading unit 21 outputs the read product identification information to the controller 20.

Then, the controller 20 identifies products stored in the storage unit 15 on the basis of the product identification information and acquires the prices and weights of the products. The controller 20 calculates an estimated total amount and an estimated total weight of all products planned to be purchased on the basis of the prices and weights of the identified products.
(Step S6)

Next, the gross weight of the products planned to be purchased is measured.

Specifically, the weight measurement unit 16 on which the shopping basket is placed measures the total weight of the products planned to be purchased by measuring the weight of the shopping basket. In addition, the weight measurement unit 16 outputs the measurement results to the controller 20.
(Step S7)

Next, the controller 20 compares the estimated total weight calculated in step S5 with the total weight measured in step S6.

Regarding the result of comparison, the estimated total weight is quite unlikely to be greater than the total weight although it may be less than the total weight. In reading through the RFID reader, all products may not be read depending on locations of RFID tags and the like. Further, the weight measurement unit 16 can measure the weights of all products in the shopping basket. Accordingly, the estimated total weight read and calculated by the RFID reader is always equal to or less than the weight measured by the weight measurement unit 16.
(Step S8)

Figure 4:
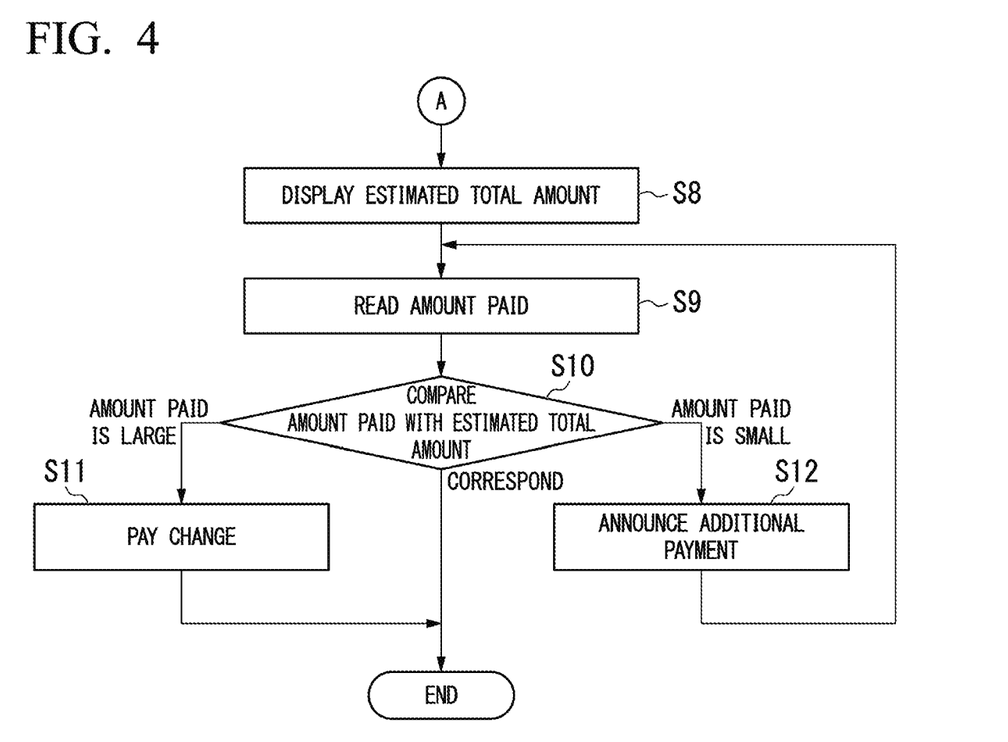
FIG. 4 is a second flowchart showing the method of controlling the product management device according to the second embodiment.

When the result of comparison in step S7 is that the estimated total weight and the measured total weight correspond, a settlement procedure of a payment is performed. The settlement procedure of the payment will be described using the flowchart of FIG. 4. FIG. 4 is a second flowchart showing the method of controlling the product management device 11 according to the second embodiment.

Specifically, the controller 20 outputs the estimated total amount calculated in step S5 to the display unit 17, as shown in FIG. 4. The display unit 17 displays the estimated total amount on the display device on the basis of an instruction of the controller 20.
(Step S9)

Next, when the product purchaser puts money into the paid amount reading unit 22, the paid amount reading unit 22 reads the type and amount of the payment. Then, the paid amount reading unit 22 outputs information about the read amount of money to the controller 20. The controller 20 calculates the amount paid on the basis of the information about the read amount of money.
(Step S10)

Next, the controller 20 compares the amount paid calculated in step S9 with the estimated total amount calculated in step S5.

When the amounts correspond to each other, the present control method ends.
(Step S11)

When the result of comparison in step S10 is that the amount paid calculated in step S9 is greater than the estimated total amount calculated in step S5, the controller 20 calculates a difference between the amount paid and the estimated total amount. The controller 20 instructs the change payment unit 23 to pay the difference as the change. Then, the change payment unit 23 pays the change according to the instruction from the controller 20 and the present control method ends.
(Step S12)

When the result of comparison in step S10 is that the amount paid calculated in step S9 is less than the estimated total amount calculated in step S5, the controller 20 instructs the display unit 17 to announce additional payment. The display unit 17 displays an announcement of additional payment on the display device on the basis of the instruction from the controller 20. Thereafter, the product purchaser makes additional payment. Accordingly, the procedure returns to step S9.
(Step S13)

Figure 5:
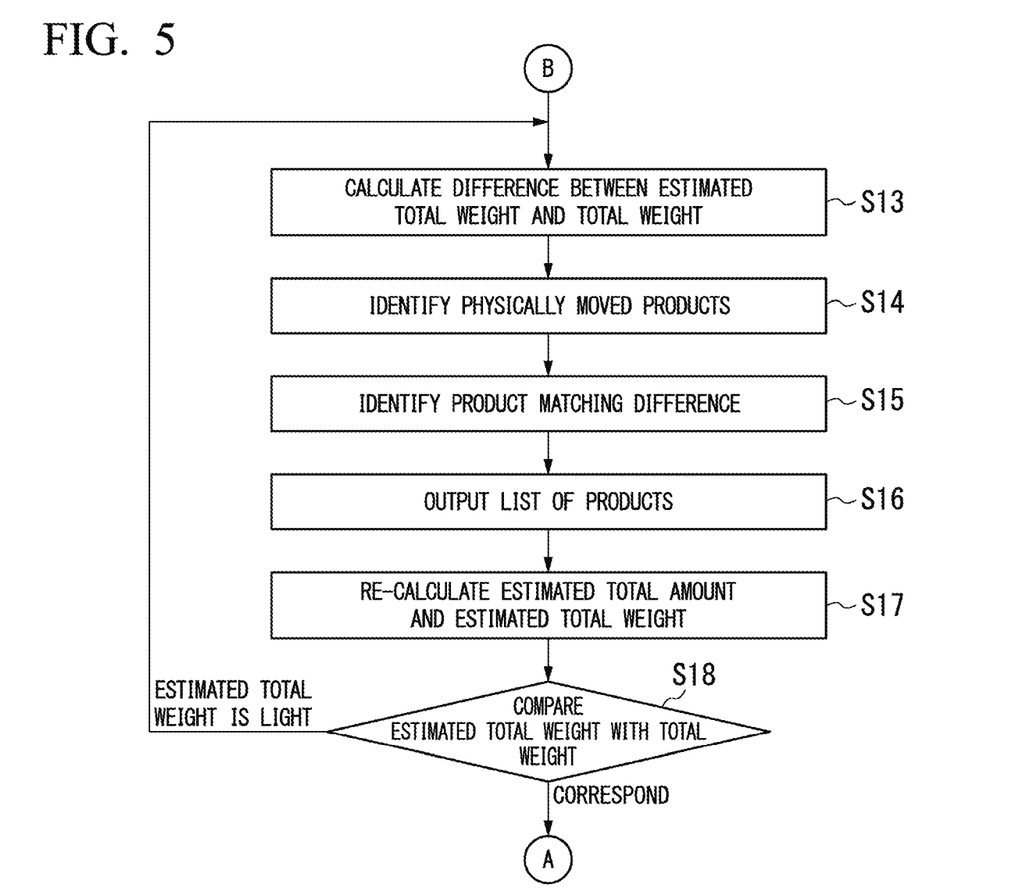
FIG. 5 is a third flowchart showing the method of controlling the product management device according to the second embodiment.

FIG. 5 is a third flowchart showing the method of controlling the product management device 11 according to the second embodiment. When the result of comparison between the estimated total weight and the total weight in step S7 (FIG. 3) is that the estimated total weight is less than the total weight, an operation of outputting a list of products is started. Here, a case in which the estimated total weight is less than the total weight means that the RFID reader has not read all products in the shopping basket due to locations of RFID tags of products, and the like. In this case, products with RFID tags which have not been read are read again. The reason why the list of products is output in step S16 which will be described later is that reference information for identifying products to be read again is provided to the product purchaser.

Specifically, first, the controller 20 calculates a difference between the estimated total weight calculated in step S5 and the total weight measured in step S6, as shown in FIG. 5.
(Step S14)

Next, the controller 20 identifies products which are highly probably contained in the shopping basket of the product purchaser.

Specifically, the controller 20 identifies products whose RSSI values have changed by a threshold value or more, whose RFID antenna numbers have changed, and which are placed at locations close to the movement path detected in step S1, among the products stored in the storage unit 15. Alternatively, the controller 20 may identify products whose RSSI values have changed by the threshold value or more and are placed at locations close to the movement path. Alternatively, the controller 20 may identify products whose RFID antenna numbers have changed and which are placed at locations close to the movement path.

A product whose RSSI value has changed by the threshold value or more and a product whose RFID antenna number has changed can be determined to be products which are very likely to have been physically moved. A product which is very likely to have been physically moved and is placed at a location close to a movement path of a product purchaser can be determined to be very likely to be contained in the shopping basket of the product purchaser. Alternatively, the controller 20 may identify a product placed at a location close to the movement path as a product which is highly probably contained in the shopping basket of the product purchaser.
(Step S15)

Next, the controller 20 identifies, on the basis of the difference calculated in step S13, products that are consistent with the difference among the products identified in step S14.

A product that is consistent with the difference may be a product having a weight that corresponds the difference or a plurality of products having a total weight that corresponds the difference. Further, a product that corresponds the difference may be all products having weights equal to or less than the difference.

For example, a case in which the difference is 500 g may be exemplified. In this case, a product having a weight of 500 g may be identified or a plurality of products having a total weight of 500 g (for example, a 200 g product and a 300 g product) may be identified among the products identified in step S14. Otherwise, all products having weights equal to or less than 500 g may be identified.

In this manner, the controller 20 identifies a product corresponding to the difference among from products which are placed at locations close to the movement path, whose RSSI values have changed by the threshold value or more, or whose RFID antenna numbers have changed.

(Step S16)

Next, the controller 20 outputs information on products obtained by excluding the products identified in step S5 from products identified in step S15 to the display unit 17. That is, the controller 20 outputs information on products obtained by excluding products whose RFID tags have been read in the shopping basket from one or a plurality of products identified on the basis of the difference. That is, the controller 20 excludes the products whose RFID tags have been read from candidates for products whose RFID tags have not been read. Then, the display unit 17 displays the corresponding products as candidates for products whose RFID tags have not been read by the RFID reader on a liquid crystal device (display device) as a list on the basis of the output from the controller 20.

The reason why the products identified in step S5 are excluded is that promoting the product purchaser to re-read products whose RFID tags have already been read is pointless.

(Step S17)

Next, an estimated total amount and an estimated total weight of the products planned to be purchased are calculated again.

Specifically, the product purchaser performs an appropriate operation on the basis of the product list displayed in step S16 such that the products identified from among the products contained in the shopping basket are read by the RFID reader again. For example, the operation may be an operation for changing the locations of the RFID tags of the products, and the like.

Then, the product reading unit 21 reads product identification information from the RFID tags of the products and outputs the read product identification information to the controller 20.

The controller 20 identifies corresponding products stored in the storage unit 15 on the basis of the product identification information and acquires the prices and weights of the products. In addition, the controller 20 re-calculates the estimated total amount and the estimated total weight of the product planned to be purchased by adding the prices and weights of the products whose production identification information has been newly read to the estimated total amount and the estimated total weight calculated in step S5.

(Step S18)

Next, the estimated total weight re-calculated in step S17 is compared with the total weight measured in step S6.

When the result of comparison is that the two correspond to each other, the procedure proceeds to step S8 (FIG. 4). On the other hand, when the re-calculated estimated total weight is less than the total weight, the procedure returns to step S13. This case represents that products whose RFID tags have not been read remain. Accordingly, the processes of step S13 to step S17 are performed.

As described in step S7, there are no cases in which the re-calculated estimated total weight is greater than the total weight.

According to the above-described product management device 11 and the method of controlling the product management device 11 of the second embodiment, it is possible to ascertain which product has been picked up by a product purchaser even in an unmanned store as in the first embodiment.

In addition, when the RFID reader has not read RFID tags of all products planned to be purchased during settlement, a list of products is also presented. Accordingly, the product purchaser can easily identify products which have not been read.

Furthermore, a list of products is presented to a product purchaser on the basis of a difference between a calculated estimated total weight and an actually measured total weight in the present embodiment. The list of products presented in the present embodiment is a list of products whose RSSI values have changed by the threshold value or more or products whose RFID antenna numbers have changed, and which are placed at locations close to a movement path. Accordingly, the list of products presented in the present embodiment is a list of products which are highly probably contained in a shopping basket of a product purchaser. In addition, a product corresponding to the weight difference is identified and displayed on the basis of the weight difference. Accordingly, it is possible to limit the number of products which are included in the list presented to the product purchaser to identify products which have not been read out of a shopping basket more easily.

Although the present invention has been described on the basis of embodiments, the present invention is not limited to the aforementioned embodiments and can be modified in various ways without departing from the spirit or scope of the present invention.

For example, although the method of using the automatic recognition technique according to camera images has been described as a method of detecting a movement path of a product purchaser in the aforementioned second embodiment, the present invention is not limited thereto. A membership card with an RFID tag attached thereto may be issued to a product purchaser and a movement path may be detected on the basis of transmitting signals transmitted from the RFID tag.

The product management devices 1 and 11 in the aforementioned embodiments include a computer system. In addition, a program for causing each process in the above-described product management devices to be performed is stored in a computer-readable recording medium of the product management devices, and the process is performed by a computer of a server device reading and executing the program. Here, the computer-readable recording medium refers to a magnetic disk, a magneto-optic disk, a CD-ROM, a DVD-ROM, a semiconductor memory or the like. Further, this computer program may be delivered to a computer through a communication line and the computer which has received the delivery may execute the program.

Moreover, the aforementioned program may be a program for realizing some of functions of the above-described processing units. Further, the program may be a so-called difference file (difference program) which can be realized by combining the above-described functions with a program which has already been recorded in a computer system.

INDUSTRIAL APPLICABILITY

According to the present invention, it is possible to ascertain which product has been picked up by a product purchaser even in an unmanned store and to present reference information for identifying products which have not been read when all products have not been read due to an erroneous operation of a reading means during settlement.

REFERENCE SIGNS LIST 1, 11 Product management device
2 Reception state storage unit
3, 12 Movement path detection unit
4 List output unit
13 RFID antenna
14 RFID module
15 Storage unit
16 Weight measurement unit
17 Display unit
18 Operation unit
19 Settlement processor
20 Controller
21 Product reading unit
22 Paid amount reading unit
23 Change payment unit

The invention claimed is:

1. A product management device, comprising:
at least one memory configured to store instructions; and
at least one processor configured to execute the instructions to,
store, on the basis of changes in reception states of signals transmitted from tag devices attached to products, identification information of the products in which changes have occurred;
detect, on the basis of the signals that are transmitted from a tag device held by a purchaser and identifying the purchaser, a movement path of the purchaser in a store in which the products are placed;
calculate a first total weight by summing up weight which is stored for each of the products identified on the basis of the signals transmitted from the tag devices attached to the products which are settlement targets;
calculate a difference between the calculated first total weight and a second total weight obtained by measuring a plurality of products which are settlement targets; and
identify products placed along the movement path and whose weight is equal to or less than the difference between the calculated first total weight and the second total weight obtained by measuring the plurality of products which are settlement targets among the products for which changes in the reception states of the transmitted signals are equal to or greater than a threshold value, and output a list of products obtained by excluding the each of products for which the transmitted signal was identified when calculating the first total weight, from the identified products.

2. The product management device according to claim 1, wherein the reception states are received signal strength indicator values.

3. A method of controlling a product management device including at least one memory configured to store instructions and at least one processor configured to execute the instructions, the method comprising:
controlling the at least one processor to:
store, on the basis of changes in reception states of signals transmitted from tag devices attached to products, identification information of the products in which changes have occurred;
detect, on the basis of the signals that are transmitted from a tag device held by a purchaser and identifying the purchaser, a movement path of the purchaser in a store in which the products are placed;
calculate a first total weight by summing up weight which is stored for each of the products identified on the basis of the signals transmitted from the tag devices attached to the products which are settlement targets;
calculate a difference between the calculated first total weight and a second total weight obtained by measuring a plurality of products which are settlement targets; and
identify products placed along the movement path and whose weight is equal to or less than the difference between the calculated first total weight and the second total weight obtained by measuring the plurality of products which are settlement targets among the products for which changes in the reception states of the transmitted signals are equal to or greater than a threshold value, and output a list of products obtained by excluding the each of products for which the transmitted signal was identified when calculating the first total weight, from the identified products.

4. A non-transitory computer-readable recording medium storing a program causing a computer of a product management device to perform process, the product management device including at least one memory configured to store instructions and at least one processor configured to execute the instructions, the process comprising:
controlling the at least one processor to:
store, on the basis of changes in reception states of signals transmitted from tag devices attached to products, identification information of the products in which changes have occurred;
detect, on the basis of the signals that are transmitted from a tag device held by a purchaser and identifying the purchaser, a movement path of the purchaser in a store in which the products are placed;
calculate a first total weight by summing up weight which is stored for each of the products identified on the basis of the signals transmitted from the tag devices attached to the products which are settlement targets;
calculate a difference between the calculated first total weight and a second total weight obtained by measuring a plurality of products which are settlement targets; and
identify products placed along the movement path and whose weight is equal to or less than the difference between the calculated first total weight and the second total weight obtained by measuring the plurality of products which are settlement targets among the products for which changes in the reception states of the transmitted signals are equal to or greater than a threshold value, and output a list of products obtained by excluding the each of products for which the transmitted signal was identified when calculating the first total weight, from the identified products.

5. The product management device according to claim 1, wherein the at least one processor is configured to execute the instructions to output the list of the products obtained by excluding the each of products for which the transmitted signal was identified when calculating the first total weight, from the products identified on the basis of the changes in the reception states of the transmitted signals, the locations of the products in relation to the movement path, and the difference between the first total weight based on the transmitted signals and the second total weight.

6. The product management device according to claim 1, wherein the at least one processor is configured to execute the instructions to identify the products whose combined total weight corresponds the difference between the first total weight and the second total weight, among the products for which the changes in the reception states are equal to or greater than the threshold value and which placed along the movement path.

7. The product management device according to claim 1, wherein the products placed along the movement path are products that are placed at locations to be picked up by the purchaser from the movement path.

* * * * *